United States Patent
Liu et al.

(10) Patent No.: US 9,882,778 B2
(45) Date of Patent: Jan. 30, 2018

(54) REMOTE ELECTRICAL TILT ANTENNA MANAGEMENT APPARATUS, SYSTEM, AND METHOD, REMOTE CONTROLLER, AND BASE STATION

(71) Applicant: HUAWEI TECHNOLOGIES CO., LTD., Shenzhen, Guangdong (CN)

(72) Inventors: Qinghua Liu, Xi'an (CN); Yong Zhang, Xi'an (CN); Weiren Qu, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/260,935

(22) Filed: Sep. 9, 2016

(65) Prior Publication Data
US 2016/0380821 A1    Dec. 29, 2016

Related U.S. Application Data

(63) Continuation of application No. PCT/CN2014/073138, filed on Mar. 10, 2014.

(51) Int. Cl.
*H04B 1/00* (2006.01)
*H04L 12/24* (2006.01)
(Continued)

(52) U.S. Cl.
CPC ......... *H04L 41/0816* (2013.01); *H01Q 3/005* (2013.01); *H04B 7/04* (2013.01);
(Continued)

(58) Field of Classification Search
CPC ............ H01Q 3/005; H01Q 3/01; H01Q 3/26; H04W 24/02
(Continued)

(56) References Cited

U.S. PATENT DOCUMENTS 9,419,833 B2 *  8/2016  Wang ................... H01Q 3/2605
2006/0229048 A1 * 10/2006  Carroll .................. H01Q 1/246
                                                                    455/268

(Continued)

FOREIGN PATENT DOCUMENTS

CN    101827375    9/2010
CN    102456948    5/2012
(Continued)

OTHER PUBLICATIONS

Jison Wang et al., Electrical tilt antenna and control method and system (machine translation of CN 102780090 Nov. 2012 in PDF format), pp. 1-10).*

(Continued)

*Primary Examiner* — Sonny Trinh
(74) *Attorney, Agent, or Firm* — Staas & Halsey LLP

(57) ABSTRACT

The present application provides a remote electrical tilt antenna management apparatus, system, and method, a remote controller, and a base station. The method includes: obtaining, by a remote control unit RCU, a first permission configuration file, where the first permission configuration file includes information about a first permission of a first base station to perform an operation on a first remote electrical tilt RET unit, and the first permission includes at least query or control; and configuring, by the RCU according to the first permission configuration file, the first permission of the first base station to perform an operation on the first RET. In this way, the first base station implements configuration of a management operation on the first RET, thereby implementing, by configuring different permission configuration files on the RCU, that a same base station manages different RETs, and further improving operability of managing a RET.

13 Claims, 4 Drawing Sheets

(51) Int. Cl.
    H04W 24/02    (2009.01)
    H01Q 3/00     (2006.01)
    H04B 7/04     (2017.01)
    H04W 88/08    (2009.01)

(52) U.S. Cl.
    CPC ......... *H04L 41/0846* (2013.01); *H04W 24/02* (2013.01); *H04W 88/085* (2013.01)

(58) Field of Classification Search
    USPC ............................ 455/25, 63.4, 562.1, 575.7
    See application file for complete search history.

(56)           References Cited

U.S. PATENT DOCUMENTS

2006/0277309 A1*  12/2006  Eaton .................. H04W 8/005
                                                              709/227
    2011/0096687 A1*   4/2011  Dottling .............. H04W 24/02
                                                              370/252
    2011/0105099 A1*   5/2011  Roll .................... H04L 67/025
                                                              455/418
    2012/0257632 A1   10/2012  Wang et al.
    2014/0022124 A1    1/2014  Zimmermann et al.
    2015/0011227 A1*   1/2015  Wellington ........... H04W 24/02
                                                              455/446

FOREIGN PATENT DOCUMENTS

CN        102780090     * 11/2012  ............... H01Q 3/00
    CN        103414020       11/2013
    CN        203386060        1/2014
    EP          2521394       11/2012
    EP          3016205        5/2016

OTHER PUBLICATIONS

International Search Report dated Nov. 28, 2014 in corresponding International Application No. PCT/CN2014/073138.
International Search Report, dated Nov. 28, 2014, in International Application No. PCT/CN2014/073138 (4 pp.).
Written Opinion of the International Searching Authority, dated Nov. 28, 2014, in International Application No. PCT/CN2014/073138 (14 pp.).
Extended European Search Report, dated Jan. 23, 2017, in European Application No. 14885171.0 (9 pp.).

* cited by examiner

REMOTE ELECTRICAL TILT ANTENNA MANAGEMENT APPARATUS, SYSTEM, AND METHOD, REMOTE CONTROLLER, AND BASE STATION

CROSS-REFERENCE TO RELATED APPLICATIONS

This application is a continuation of International Application No. PCT/CN2014/073138, filed on Mar. 10, 2014, which is hereby incorporated by reference in its entirety.

TECHNICAL FIELD

Embodiments of the present application relate to the field of communications technologies, and in particular, to a remote electrical tilt antenna management apparatus, system, and method, a remote controller, and a base station.

BACKGROUND

With development of communications technologies, to make it more convenient and quick to install an antenna and a remote electrical tilt device, a remote electrical tilt (RET) unit may be built in the antenna, to avoid recording a mapping relationship between the antenna and the remote electrical tilt unit.

FIG. 1 is a schematic structural diagram of a prior-art remote electrical tilt antenna management apparatus according to an embodiment of the present application. As shown in FIG. 1, a base station 1 is connected to a remote control unit (RCU) by using a first Antenna Interface Standards Group (AISG) port. A base station 2 is connected to the RCU by using a second AISG port. The RCU controls a RET 1, a RET 2, and a RET 3. In the prior art, when RETs establish physical connections to multiple base stations, first, different base stations are connected to different Antenna Interface Standards Group (AISG) ports of an RCU, so that the multiple base stations are connected to different RETs by using the different corresponding AISGs, and control the RETs. There is a correspondence between an AISG port and a RET. For example, the base station 1 is connected to a first AISG port of an antenna, to implement management on the first RET. That is, each RET can be managed and configured by only one base station corresponding to an AISG port.

However, in the prior art, each RET can be managed and configured by only one base station corresponding to an AISG port. Consequently, it is inconvenient for multiple base stations to simultaneously manage one RET or multiple RETs.

SUMMARY

Embodiments of the present application provide a remote electrical tilt antenna management apparatus, system, and method, a remote controller, and a base station, which are used to resolve a problem that a base station inconveniently manages a RET.

A first aspect provides a remote electrical tilt antenna management apparatus, including:

an obtaining module, configured to obtain a first permission configuration file, where the first permission configuration file includes information about a first permission of a first base station to perform an operation on a first remote electrical tilt RET unit, and the first permission includes at least a query permission or a control permission; and a configuration module, configured to configure, according to the first permission configuration file, the first permission of the first base station to perform an operation on the first RET.

In a first possible implementation manner, the configuration module is further configured to configure, according to the first permission configuration file, the second permission of the second base station to perform an operation on the first RET.

With reference to the first aspect or the first possible implementation manner of the first aspect, in a second possible implementation manner, the configuration module is further configured to configure, according to the first permission configuration file, the third permission of the second base station to perform an operation on the second RET.

With reference to the first possible implementation manner of the first aspect or the second possible implementation manner of the first aspect, in a third possible implementation manner, the configuration module is specifically configured to determine a first correspondence among the second base station, a second AISG port, and the first RET according to the first permission configuration file, and the second AISG port is a port connecting the RCU and the second base station; and the RCU configures, according to the first correspondence, the second permission of the second base station to perform an operation on the first RET.

With reference to the second possible implementation manner of the first aspect or the third possible implementation manner of the first aspect, in a fourth possible implementation manner, the configuration module is specifically configured to determine a second correspondence among the second base station, the second AISG port, and the second RET according to the first permission configuration file, where the second AISG port is the port connecting the RCU and the second base station; and the RCU configures, according to the second correspondence, the third permission of the second base station to perform an operation on the second RET.

With reference to any implementation manner of the first aspect to the fourth possible implementation manner of the first aspect, in a fifth possible implementation manner, the configuration module is specifically configured to determine a third correspondence among the first base station, a first Antenna Interface Standards Group AISG port, and the first RET according to the first permission configuration file, and the first AISG port is a port connecting the RCU and the first base station; and the RCU configures, according to the third correspondence, the first permission of the first base station to perform an operation on the first RET.

With reference to any implementation manner of the first aspect to the fifth possible implementation manner of the first aspect, in a sixth possible implementation manner, the obtaining module is further configured to obtain a second permission configuration file, where the second permission configuration file includes information about a fourth permission of a third base station to perform an operation on the first RET, and the fourth permission includes at least a query permission or a control permission; and the configuration module is further configured to configure, according to the second permission configuration file, the fourth permission of the third base station to perform an operation on the first RET.

With reference to the sixth possible implementation manner of the first aspect, in a seventh possible implementation manner, the configuration module is further configured to configure, according to the second permission configuration file, a fifth permission of the third base station to perform an operation on the second RET.

With reference to the sixth possible implementation manner of the first aspect or the seventh possible implementation manner of the first aspect, in an eighth possible implementation manner, the configuration module is specifically configured to determine a fourth correspondence among the third base station, a third AISG port, and the first RET according to the second permission configuration file, where the third AISG port is a port connecting the RCU and the third base station; and the RCU configures, according to the fourth correspondence, the fourth permission of the third base station to perform an operation on the first RET.

With reference to any implementation manner of the sixth possible implementation manner of the first aspect to the eighth possible implementation manner of the first aspect, in a ninth possible implementation manner, the apparatus further includes a deletion module, where the deletion module is configured to delete the first permission of the first base station to perform an operation on the first RET, where the first permission is a control permission; or the deletion module is configured to delete the second permission of the second base station to perform an operation on the first RET, where the second permission is a control permission.

With reference to any implementation manner of the first aspect to the ninth possible implementation manner of the first aspect, in a tenth possible implementation manner, the obtaining module is specifically configured to obtain a first permission configuration file that is sent by the first base station; and the obtaining module is further configured to obtain a second permission configuration file that is sent by the third base station.

A second aspect provides a remote electrical tilt antenna management apparatus, including:

an obtaining module, configured to obtain a first permission configuration file, where the first permission configuration file includes information about a first permission of a first base station to perform an operation on a first remote electrical tilt RET unit, and the first permission includes at least a query permission or a control permission; and a sending module, configured to send the first permission configuration file to a remote control unit RCU, so that the RCU configures the first permission of the first base station to perform an operation on the first RET.

In a first possible implementation manner, the first permission configuration file further includes information about a second permission of the second base station to perform an operation on the first RET, where the second permission is different from the first permission, or both the second permission and the first permission are query permissions.

With reference to the second aspect or the first possible implementation manner of the second aspect, in a second possible implementation manner, the first permission configuration file further includes information about a third permission of the second base station to perform an operation on a second RET, where the third permission includes at least a query permission or a control permission.

With reference to any implementation manner of the second aspect to the second possible implementation manner of the second aspect, in a third possible implementation manner, the apparatus further includes:

the sending module is further configured to send a second permission configuration file to the RCU, so that the RCU configures a second permission of the first base station to perform an operation on the second RET, where the second permission configuration file includes information about a third permission of a third base station to perform an operation on the first RET, and the third permission includes a control permission or a query permission.

A third aspect provides a remote controller, including:

an obtainer, configured to obtain a first permission configuration file, where the first permission configuration file includes information about a first permission of a first base station to perform an operation on a first remote electrical tilt RET unit, and the first permission includes at least a query permission or a control permission; and a processor, configured to configure, according to the first permission configuration file, the first permission of the first base station to perform an operation on the first RET.

In a first possible implementation manner, the processor is further configured to configure, according to the first permission configuration file, the second permission of the second base station to perform an operation on the first RET.

With reference to the third aspect or the first possible implementation manner of the third aspect, in a second possible implementation manner, the processor is further configured to configure, according to the first permission configuration file, the third permission of the second base station to perform an operation on the second RET.

With reference to the first possible implementation manner of the third aspect or the second possible implementation manner of the third aspect, in a third possible implementation manner, the processor is specifically configured to: determine a first correspondence among the second base station, a second AISG port, and the first RET according to the first permission configuration file, where the second AISG port is a port connecting the RCU and the second base station; and configure, according to the first correspondence, the second permission of the second base station to perform an operation on the first RET.

With reference to the second possible implementation manner of the third aspect or the third possible implementation manner of the third aspect, in a fourth possible implementation manner, the processor is specifically configured to determine a second correspondence among the second base station, the second AISG port, and the second RET according to the first permission configuration file, where the second AISG port is the port connecting the RCU and the second base station; and the RCU configures, according to the second correspondence, the third permission of the second base station to perform an operation on the second RET.

With reference to any implementation manner of the third aspect to the fourth possible implementation manner of the third aspect, in a fifth possible implementation manner, the processor is specifically configured to determine a third correspondence among the first base station, a first Antenna Interface Standards Group AISG port, and the first RET according to the first permission configuration file, where the first AISG port is a port connecting the RCU and the first base station; and the RCU configures, according to the third correspondence, the first permission of the first base station to perform an operation on the first RET.

With reference to any implementation manner of the third aspect to the fifth possible implementation manner of the third aspect, in a sixth possible implementation manner, the obtainer is further configured to obtain a second permission configuration file, where the second permission configuration file includes information about a fourth permission of a third base station to perform an operation on the first RET, and the fourth permission includes at least a query permission or a control permission; and the processor is further configured to configure, according to the second permission configuration file, the fourth permission of the third base station to perform an operation on the first RET.

With reference to the sixth possible implementation manner of the third aspect, in a seventh possible implementation manner, the processor is specifically configured to configure, according to the second permission configuration file, a fifth permission of the third base station to perform an operation on the second RET.

With reference to the sixth possible implementation manner of the third aspect or the seventh possible implementation manner of the third aspect, in an eighth possible implementation manner, the processor is specifically configured to determine a fourth correspondence among the third base station, a third AISG port, and the first RET according to the second permission configuration file, where the third AISG port is a port connecting the RCU and the third base station; and the RCU configures, according to the fourth correspondence, the fourth permission of the third base station to perform an operation on the first RET.

With reference to any implementation manner of the sixth possible implementation manner of the third aspect to the eighth possible implementation manner of the third aspect, in a ninth possible implementation manner, the processor is further configured to: delete the first permission of the first base station to perform an operation on the first RET, where the first permission is a control permission; or delete the second permission of the second base station to perform an operation on the first RET, where the second permission is a control permission.

With reference to any implementation manner of the third aspect to the ninth possible implementation manner of the third aspect, in a tenth possible implementation manner, the obtainer is specifically configured to obtain a first permission configuration file that is sent by the first base station; or the obtainer is specifically configured to obtain a second permission configuration file that is sent by the third base station.

A fourth aspect provides a base station, including:

an obtainer, configured to obtain a first permission configuration file, where the first permission configuration file includes information about a first permission of a first base station to perform an operation on a first remote electrical tilt RET unit, and the first permission includes at least a query permission or a control permission; and a transmitter, configured to send the first permission configuration file to a remote control unit RCU, so that the RCU configures the first permission of the first base station to perform an operation on the first RET.

In a first possible implementation manner, the first permission configuration file further includes information about a second permission of the second base station to perform an operation on the first RET, where the second permission is different from the first permission, or both the second permission and the first permission are query permissions.

With reference to the fourth aspect or the first possible implementation manner of the fourth aspect, in a second possible implementation manner, the first permission configuration file further includes information about a third permission of the second base station to perform an operation on a second RET, where the third permission includes at least a query permission or a control permission.

With reference to any implementation manner of the fourth aspect to the second possible implementation manner of the fourth aspect, in a third possible implementation manner, the transmitter is further configured to send a second permission configuration file to the RCU, so that the RCU configures a second permission of the first base station to perform an operation on the second RET, where the second permission configuration file includes information about a third permission of the third base station to perform an operation on the first RET, and the third permission includes a control permission or a query permission.

A fifth aspect provides a remote electrical tilt antenna management method, including:

obtaining, by a remote control unit RCU, a first permission configuration file, where the first permission configuration file includes information about a first permission of a first base station to perform an operation on a first remote electrical tilt RET unit, and the first permission includes at least a query permission or a control permission; and configuring, by the RCU according to the first permission configuration file, the first permission of the first base station to perform an operation on the first RET.

In a first possible implementation manner, the first permission configuration file further includes information about a second permission of the second base station to perform an operation on the first RET, where the second permission is different from the first permission, or both the second permission and the first permission are query permissions; and the configuring, by the RCU according to the first permission configuration file, the first permission of the first base station to perform an operation on the first RET further includes:

configuring, by the RCU according to the first permission configuration file, the second permission of the second base station to perform an operation on the first RET.

With reference to the fifth aspect or the first possible implementation manner of the fifth aspect, in a second possible implementation manner, the first permission configuration file further includes information about a third permission of the second base station to perform an operation on a second RET, where the third permission includes at least a query permission or a control permission; and the configuring, by the RCU according to the first permission configuration file, the first permission of the first base station to perform an operation on the first RET further includes:

configuring, by the RCU according to the first permission configuration file, the third permission of the second base station to perform an operation on the second RET.

With reference to the first possible implementation manner of the fifth aspect or the second possible implementation manner of the fifth aspect, in a third possible implementation manner, the configuring, by the RCU according to the first permission configuration file, the second permission of the second base station to perform an operation on the first RET includes:

determining, by the RCU, a first correspondence among the second base station, a second AISG port, and the first RET according to the first permission configuration file, where the second AISG port is a port connecting the RCU and the second base station; and configuring, by the RCU according to the first correspondence, the second permission of the second base station to perform an operation on the first RET.

With reference to the second possible implementation manner of the fifth aspect or the third possible implementation manner of the fifth aspect, in a fourth possible implementation manner, the configuring, by the RCU according to the first permission configuration file, the third permission of the second base station to perform an operation on the second RET includes:

determining, by the RCU, a second correspondence among the second base station, the second AISG port, and the second RET according to the first permission configuration file, where the second AISG port is the port connecting the RCU and the second base station; and configuring, by the RCU according to the second correspondence, the third permission of the second base station to perform an operation on the second RET.

With reference to any implementation manner of the fifth aspect to the fourth possible implementation manner of the fifth aspect, in a fifth possible implementation manner, the configuring, by the RCU according to the first permission configuration file, the first permission of the first base station to perform an operation on the first RET includes:

determining, by the RCU, a third correspondence among the first base station, a first Antenna Interface Standards Group AISG port, and the first RET according to the first permission configuration file, where the first AISG port is a port connecting the RCU and the first base station; and configuring, by the RCU according to the third correspondence, the first permission of the first base station to perform an operation on the first RET.

With reference to any implementation manner of the fifth aspect to the fifth possible implementation manner of the fifth aspect, in a sixth possible implementation manner, after the configuring, by the RCU according to the first permission configuration file, the first permission of the first base station to perform an operation on the first RET, the method further includes:

obtaining, by the RCU, a second permission configuration file, where the second permission configuration file includes information about a fourth permission of a third base station to perform an operation on the first RET, and the fourth permission includes at least a query permission or a control permission; and configuring, by the RCU according to the second permission configuration file, the fourth permission of the third base station to perform an operation on the first RET.

With reference to the sixth possible implementation manner of the fifth aspect, in a seventh possible implementation manner, the second permission configuration file further includes information about a fifth permission of the third base station to perform an operation on the second RET; and the configuring, by the RCU according to the second permission configuration file, the fourth permission of the third base station to perform an operation on the first RET further includes:

configuring, by the RCU according to the second permission configuration file, the fifth permission of the third base station to perform an operation on the second RET.

With reference to the sixth possible implementation manner of the fifth aspect or the seventh possible implementation manner of the fifth aspect, in an eighth possible implementation manner, the configuring, by the RCU according to the second permission configuration file, the fourth permission of the third base station to perform an operation on the first RET includes:

determining, by the RCU, a fourth correspondence among the third base station, a third AISG port, and the first RET according to the second permission configuration file, where the third AISG port is a port connecting the RCU and the third base station; and configuring, by the RCU according to the fourth correspondence, the fourth permission of the third base station to perform an operation on the first RET.

With reference to any implementation manner of the sixth possible implementation manner of the fifth aspect to the eighth possible implementation manner of the fifth aspect, in a ninth possible implementation manner, either of the second permission or the first permission is the same as the third permission, and the third permission is a control permission; and after the configuring, by the RCU according to the second permission configuration file, the fourth permission of the third base station to perform an operation on the first RET, the method further includes:

deleting, by the RCU, the first permission of the first base station to perform an operation on the first RET, where the first permission is a control permission; or deleting, by the RCU, the second permission of the second base station to perform an operation on the first RET, where the second permission is a control permission.

With reference to any implementation manner of the fifth aspect to the ninth possible implementation manner of the fifth aspect, in a tenth possible implementation manner, the obtaining, by a remote control unit RCU, a first permission configuration file includes:

obtaining, by the remote control unit RCU, a first permission configuration file that is sent by the first base station; and the obtaining, by the RCU, a second permission configuration file includes:

obtaining, by the RCU, a second permission configuration file that is sent by the third base station.

A sixth aspect provides a remote electrical tilt antenna management method, including:

obtaining, by a first base station, a first permission configuration file, where the first permission configuration file includes information about a first permission of the first base station to perform an operation on a first remote electrical tilt RET unit, and the first permission includes at least a query permission or a control permission; and sending, by the first base station, the first permission configuration file to a remote control unit RCU, so that the RCU configures the first permission of the first base station to perform an operation on the first RET.

In a first possible implementation manner, the first permission configuration file further includes information about a second permission of the second base station to perform an operation on the first RET, where the second permission is different from the first permission, or both the second permission and the first permission are query permissions.

With reference to the sixth aspect or the first possible implementation manner of the sixth aspect, in a second possible implementation manner, the first permission configuration file further includes information about a third permission of the second base station to perform an operation on a second RET, where the third permission includes at least a query permission or a control permission.

With reference to any implementation manner of the sixth aspect to the second possible implementation manner of the sixth aspect, in a third possible implementation manner, the method further includes:

sending, by the first base station, the second permission configuration file to the RCU, so that the RCU configures the second permission of the first base station to perform an operation on the second RET, where the second permission configuration file includes information about a third permission of the third base station to perform an operation on the first RET, and the third permission includes a control permission or a query permission.

A seventh aspect provides a remote electrical tilt antenna management system, including: the remote electrical tilt antenna management apparatus according to the first aspect, and the remote electrical tilt antenna management apparatus according to the second aspect.

An eighth aspect provides a remote electrical tilt antenna management system, including: the remote controller according to the third aspect, and the base station according to the fourth aspect.

According to the remote electrical tilt antenna management apparatus, system, and method, the remote controller, and the base station, in the embodiments of the present application, a remote control unit RCU obtains a first permission configuration file, where the first permission configuration file includes information about a first permission of a first base station to perform an operation on a first remote electrical tilt RET unit, and the first permission includes at least a query permission or a control permission; and the RCU configures, according to the first permission configuration file, the first permission of the first base station to perform an operation on the first RET. This enables the first base station to perform configuration of a management operation on the first RET, thereby implementing, by configuring different permission configuration files in the RCU, that a same base station manages different RETs, and further improving operability of managing a RET.

BRIEF DESCRIPTION OF DRAWINGS

To describe the technical solutions in the embodiments of the present application or in the prior art more clearly, the following briefly describes the accompanying drawings required for describing the embodiments or the prior art. Apparently, the accompanying drawings in the following description show some embodiments of the present application, and persons of ordinary skill in the art may still derive other drawings from these accompanying drawings without creative efforts.

DESCRIPTION OF EMBODIMENTS

To make the objectives, technical solutions, and advantages of the embodiments of the present application clearer, the following clearly describes the technical solutions in the embodiments of the present application with reference to the accompanying drawings in the embodiments of the present application. Apparently, the described embodiments are a part rather than all of the embodiments of the present application. All other embodiments obtained by persons of ordinary skill in the art based on the embodiments of the present application without creative efforts shall fall within the protection scope of the present application.

A remote electrical tilt antenna management method provided in the embodiments of the present application may be specifically applied to: when multiple base stations share a multiband RET antenna, the multiple base stations perform control permission configuration or query permission configuration on a same RET or perform control permission configuration or query permission configuration on multiple RETs. The remote electrical tilt antenna management method provided in the embodiments may be specifically executed by a remote electrical tilt antenna management apparatus or a remote controller. The remote electrical tilt antenna management apparatus or the remote controller may be configured in the multiband RET antenna. The remote electrical tilt antenna management apparatus or the remote controller may be implemented in a software and/or hardware manner. The remote electrical tilt antenna management apparatus or the remote controller may be used in a communications system of any standard. For example, the communications system may be specifically Code Division Multiple Access (CDMA), Time Division-Synchronous Code Division Multiple Access (TD-SCDMA), Long Term Evolution (LTE), or a wireless local area network (WLAN).

Figure 1:
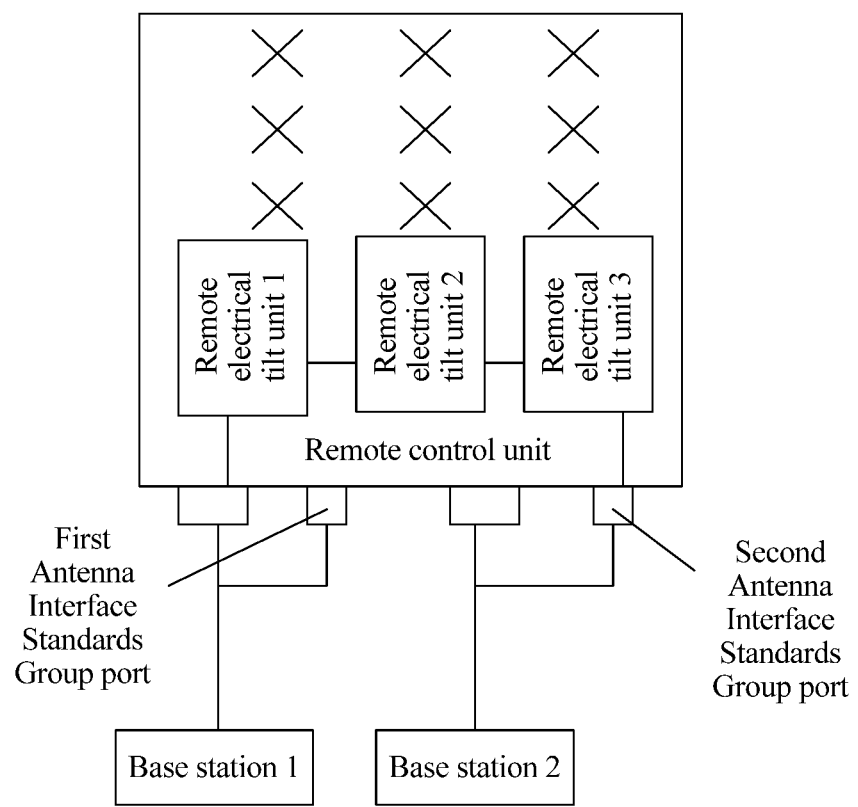
FIG. 1 is a schematic structural diagram of a prior-art remote electrical tilt antenna management apparatus according to an embodiment of the present application.
Figure 2:
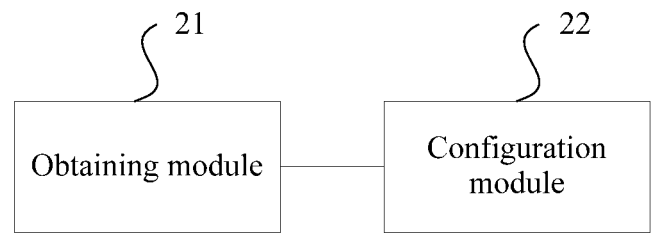
FIG. 2 is a schematic structural diagram of a remote electrical tilt antenna management apparatus according to an embodiment of the present application.

FIG. 2 is a schematic structural diagram of a remote electrical tilt antenna management apparatus according to an embodiment of the present application. As shown in FIG. 2, the remote electrical tilt antenna management apparatus includes an obtaining module 21 and a configuration module 22.

The obtaining module 21 is configured to obtain a first permission configuration file, where the first permission configuration file includes information about a first permission of a first base station to perform an operation on a first remote electrical tilt RET unit, and the first permission includes at least a query permission or a control permission. It should be noted that, the first permission may further include an exclusive permission. The exclusive permission means that a base station has all permissions, for example, the query permission and the control permission, to perform operations on the RET, and another base station has no permission for the RET. The configuration module 22 is configured to configure, according to the first permission configuration file, the first permission of the first base station to perform an operation on the first RET.

Specifically, the configuration module 22 is specifically configured to: determine a third correspondence among the first base station, a first Antenna Interface Standards Group AISG port, and the first RET according to the first permission configuration file, where the first AISG port is a port connecting the RCU and the first base station; and configure, according to the third correspondence, the first permission of the first base station to perform an operation on the first RET.

Further, the first permission configuration file may further include information about a second permission of a second base station to perform an operation on the first RET, where the second permission is different from the first permission, or both the second permission and the first permission are query permissions. It should be noted that, a permission of the second base station cannot conflict with a permission of the first base station for a same first RET. That is, the first permission and the second permission cannot be both a control permission or both an exclusive permission. For example, both the first permission and the second permission may be query permissions; or the first permission is a control permission and the second permission is a query permission; or the first permission is a query permission and the second permission is a control permission. In this embodiment, if both the first permission and the second permission are query permissions, the RCU may further receive a permission configuration file sent by the first base station, the second base station, or a third base station, and a base station that has a control permission for the first RET is indicated in the file. For a specific implementation manner, details are not repeatedly described herein. Correspondingly, the configuration module 22 is further configured to configure, according to the first permission configuration file, the second permission of the second base station to perform an operation on the first RET. That is, the configuration module 22 is specifically configured to determine a first correspondence among the second base station, a second AISG port, and the first RET according to the first permission configuration file, where the second AISG port is a port connecting the RCU and the second base station; and the RCU configures, according to the first correspondence, the second permission of the second base station to perform an operation on the first RET.

On the basis of the foregoing embodiment, the first permission configuration file may further include information about a third permission of the second base station to perform an operation on a second RET, where the third permission includes at least a query permission or a control permission. Correspondingly, the configuration module 22 is further configured to configure, according to the first permission configuration file, the third permission of the second base station to perform an operation on the second RET. That is, the configuration module 22 is specifically configured to determine a second correspondence among the second base station, the second AISG port, and the second RET according to the first permission configuration file, where the second AISG port is the port connecting the RCU and the second base station; and the RCU configures, according to the second correspondence, the third permission of the second base station to perform an operation on the second RET.

In this embodiment, a remote control unit RCU obtains a first permission configuration file, where the first permission configuration file includes information about a first permission of a first base station to perform an operation on a first remote electrical tilt RET unit, and the first permission includes at least a query permission or a control permission; and the RCU configures, according to the first permission configuration file, the first permission of the first base station to perform an operation on the first RET. This enables the first base station to perform configuration of a management operation on the first RET, thereby implementing, by configuring different permission configuration files in the RCU, that a same base station manages different RETs, and further improving operability of managing a RET.

Further, on the basis of the foregoing embodiment, the obtaining module 21 is further configured to obtain a second permission configuration file, where the second permission configuration file includes information about a fourth permission of a third base station to perform an operation on the first RET, and the fourth permission includes at least a query permission or a control permission.

For example, the obtaining module 21 is specifically configured to obtain a second permission configuration file that is sent by the third base station. Alternatively, the obtaining module 21 is specifically configured to obtain a second permission configuration file that is sent by the first base station or the second base station.

It should be noted that, when any base station connected to the RCU needs to send a permission configuration file to the RCU, the base station may directly send the permission configuration file to the RCU. This means that any base station whether having a control permission or not for a RET can send the permission configuration file.

The configuration module 22 is further configured to configure, according to the second permission configuration file, the fourth permission of the third base station to perform an operation on the first RET.

For example, the configuration module 22 is further configured to configure, according to the second permission configuration file, a fifth permission of the third base station to perform an operation on the second RET, where the second permission configuration file further includes information about the fifth permission of the third base station to perform an operation on a third RET.

Specifically, the configuration module 22 is specifically configured to determine a fourth correspondence among the third base station, a third AISG port, and the first RET according to the second permission configuration file, where the third AISG port is a port connecting the RCU and the third base station; and the RCU configures, according to the fourth correspondence, the fourth permission of the third base station to perform an operation on the first RET.

The remote electrical tilt antenna management apparatus may further include a deletion module.

The deletion module is configured to delete the first permission of the first base station to perform an operation on the first RET, where the first permission is a control permission; or the deletion module is configured to delete the second permission of the second base station to perform an operation on the first RET, where the second permission is a control permission.

On the basis of the foregoing embodiment, the obtaining module 21 is specifically configured to obtain a first permission configuration file that is sent by the first base station.

The obtaining module 21 is further configured to obtain a second permission configuration file that is sent by the third base station.

Figure 3:
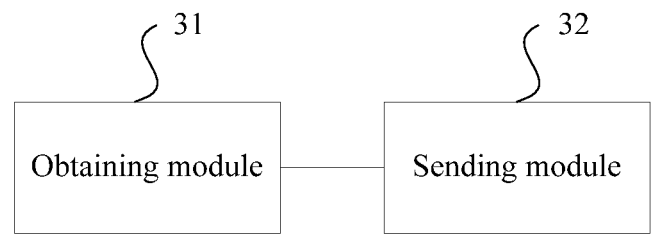
FIG. 3 is a schematic structural diagram of a remote electrical tilt antenna management apparatus according to another embodiment of the present application.

FIG. 3 is a schematic structural diagram of a remote electrical tilt antenna management apparatus according to another embodiment of the present application. As shown in FIG. 3, the remote electrical tilt antenna management apparatus includes an obtaining module 31 and a sending module 32.

The obtaining module 31 is configured to obtain a first permission configuration file, where the first permission configuration file includes information about a first permission of a first base station to perform an operation on a first remote electrical tilt RET unit, and the first permission includes at least a query permission or a control permission.

The sending module 32 is configured to send the first permission configuration file to a remote control unit RCU, so that the RCU configures the first permission of the first base station to perform an operation on the first RET.

A first base station obtains a first permission configuration file, where the first permission configuration file includes information about a first permission of the first base station to perform an operation on a first RET, and the first permission includes at least a query permission or a control permission; and the first base station sends the first permission configuration file to a remote control unit RCU, so that the RCU configures the first permission of the first base station to perform an operation on the first RET. This enables the first base station to perform configuration of a management operation on the first RET, thereby implementing, by configuring different permission configuration files by a base station in the RCU, that a same base station manages different RETs, and further improving operability of managing a remote electrical tilt RET unit.

On the basis of the foregoing embodiment, the first permission configuration file further includes information about a second permission of a second base station to perform an operation on the first RET, where the second permission is different from the first permission, or both the second permission and the first permission are query permissions.

Optionally, the first permission configuration file further includes information about a third permission of the second base station to perform an operation on a second RET, where the third permission includes at least a query permission or a control permission.

On the basis of the foregoing embodiment, the sending module 32 is further configured to send the second permission configuration file to the RCU, so that the RCU configures the second permission of the first base station to perform an operation on the second RET, where the second permission configuration file includes information about a third permission of a third base station to perform an operation on the first RET, and the third permission information includes a control permission or a query permission.

Figure 4:
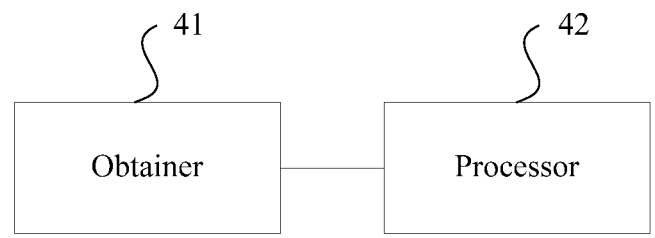
FIG. 4 is a schematic structural diagram of a remote controller according to an embodiment of the present application.

FIG. 4 is a schematic structural diagram of a remote controller according to an embodiment of the present application. As shown in FIG. 4, the remote controller includes an obtainer 41 and a processor 42.

The obtainer 41 is configured to obtain a first permission configuration file, where the first permission configuration file includes information about a first permission of a first base station to perform an operation on a first remote electrical tilt RET unit, and the first permission includes at least a query permission or a control permission. The processor 42 is configured to configure, according to the first permission configuration file, the first permission of the first base station to perform an operation on the first RET.

Specifically, the processor 42 is specifically configured to determine a third correspondence among the first base station, a first Antenna Interface Standards Group AISG port, and the first RET according to the first permission configuration file, where the first AISG port is a port connecting the RCU and the first base station; and the RCU configures, according to the third correspondence, the first permission of the first base station to perform an operation on the first RET.

Further, the first permission configuration file may further include information about a second permission of a second base station to perform an operation on the first RET, where the second permission is different from the first permission, or both the second permission and the first permission are query permissions. Correspondingly, the processor 42 is further configured to configure, according to the first permission configuration file, the second permission of the second base station to perform an operation on the first RET. That is, the processor 42 is specifically configured to determine a first correspondence among the second base station, a second AISG port, and the first RET according to the first permission configuration file, where the second AISG port is a port connecting the RCU and the second base station; and the RCU configures, according to the first correspondence, the second permission of the second base station to perform an operation on the first RET.

On the basis of the foregoing embodiment, the first permission configuration file may further include information about a third permission of the second base station to perform an operation on a second RET, where the third permission includes at least a query permission or a control permission. Correspondingly, the processor 42 is further configured to configure, according to the first permission configuration file, the third permission of the second base station to perform an operation on the second RET. That is, the processor 42 is specifically configured to determine a second correspondence among the second base station, the second AISG port, and the second RET according to the first permission configuration file, where the second AISG port is the port connecting the RCU and the second base station; and the RCU configures, according to the second correspondence, the third permission of the second base station to perform an operation on the second RET.

In this embodiment, a remote control unit RCU obtains a first permission configuration file, where the first permission configuration file includes information about a first permission of a first base station to perform an operation on a first remote electrical tilt RET unit, and the first permission includes at least a query permission or a control permission; and the RCU configures, according to the first permission configuration file, the first permission of the first base station to perform an operation on the first RET. This enables the first base station to perform configuration of a management operation on the first RET, thereby implementing, by configuring different permission configuration files in the RCU, that a same base station manages different RETs, and further improving operability of managing a remote electrical tilt RET unit.

Further, on the basis of the foregoing embodiment, the obtainer 41 is further configured to obtain a second permission configuration file, where the second permission configuration file includes information about a fourth permission of a third base station to perform an operation on the first RET, and the fourth permission includes at least a query permission or a control permission.

The processor 42 is further configured to configure, according to the second permission configuration file, the fourth permission of the third base station to perform an operation on the first RET.

For example, the processor 42 is specifically configured to configure, according to the second permission configuration file, the fifth permission of the third base station to perform an operation on the second RET.

Specifically, the processor 42 is specifically configured to determine a fourth correspondence among the third base station, a third AISG port, and the first RET according to the second permission configuration file, where the third AISG port is a port connecting the RCU and the third base station; and the RCU configures, according to the fourth correspondence, the fourth permission of the third base station to perform an operation on the first RET.

In this embodiment, the processor 42 is further configured to: delete the first permission of the first base station to perform an operation on the first RET, where the first permission is a control permission; or delete the second permission of the second base station to perform an operation on the first RET, where the second permission is a control permission.

Further, on the basis of the foregoing embodiment, the obtainer 41 is specifically configured to obtain a first permission configuration file that is sent by the first base station; or the obtainer 41 is specifically configured to obtain a second permission configuration file that is sent by the third base station.

Figure 5:
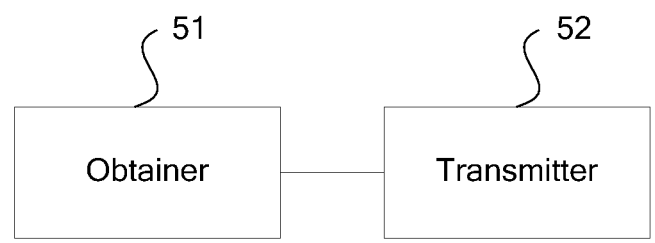
FIG. 5 is a schematic structural diagram of a base station according to an embodiment of the present application.

FIG. 5 is a schematic structural diagram of a base station according to an embodiment of the present application. As shown in FIG. 5, the base station includes an obtainer 51 and a transmitter 52.

The obtainer 51 is configured to obtain a first permission configuration file, where the first permission configuration file includes information about a first permission of a first base station to perform an operation on a first remote electrical tilt RET unit, and the first permission includes at least a query permission or a control permission.

The transmitter 51 is configured to send the first permission configuration file to a remote control unit RCU, so that the RCU configures the first permission of the first base station to perform an operation on the first RET.

A first base station obtains a first permission configuration file, where the first permission configuration file includes information about a first permission of the first base station to perform an operation on a first RET, and the first permission includes at least a query permission or a control permission; and the first base station sends the first permission configuration file to a remote control unit RCU, so that the RCU configures the first permission of the first base station to perform an operation on the first RET. This enables the first base station to perform configuration of a management operation on the first RET, thereby implementing, by configuring different permission configuration files by a base station in the RCU, that a same base station manages different RETs, and further improving operability of managing a remote electrical tilt RET unit.

Optionally, the first permission configuration file further includes information about a second permission of a second base station to perform an operation on the first RET, where the second permission is different from the first permission, or both the second permission and the first permission are query permissions.

Optionally, the first permission configuration file further includes information about a third permission of the second base station to perform an operation on a second RET, where the third permission includes at least a query permission or a control permission.

On the basis of the foregoing embodiment, the transmitter 51 is further configured to send the second permission configuration file to the RCU, so that the RCU configures the second permission of the first base station to perform an operation on the second RET, where the second permission configuration file includes information about a third permission of a third base station to perform an operation on the first RET, and the third permission information includes a control permission or a query permission.

Figure 6:
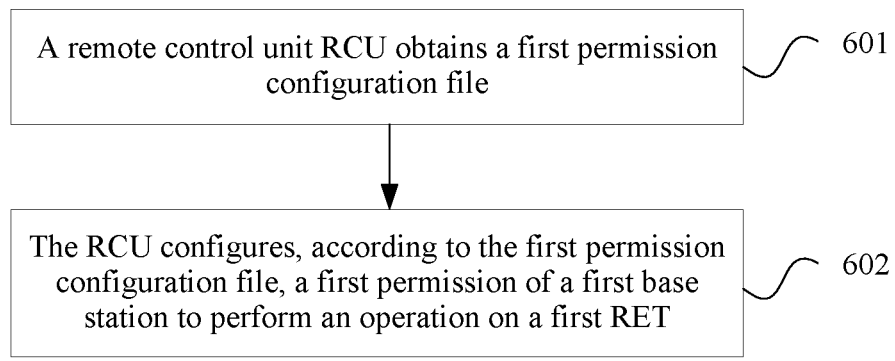
FIG. 6 is a flowchart of a remote electrical tilt antenna management method according to an embodiment of the present application.

FIG. 6 is a flowchart of a remote electrical tilt antenna management method according to an embodiment of the present application. As shown in FIG. 6, an applicable scenario of this embodiment is that multiple remote electrical tilt RET units share a built-in remote electrical tilt control unit RCU, the RCU provides multiple groups of AISC ports for base stations, and the multiple base stations, by using the one remote electrical tilt unit RCU, jointly control and manage the multiple remote electrical tilt RET units. The method includes the following steps:

Step 601: The remote control unit RCU obtains a first permission configuration file.

Specifically, that the remote control unit RCU obtains the first permission configuration file includes at least the following four applicable scenarios:

A first applicable scenario: the first permission configuration file includes information about a first permission of a first base station to perform an operation on a first RET, where the first permission includes at least a query permission or a control permission. For example, the first permission information is that a permission of the first base station to perform an operation on the first RET is a query permission. That is, the first base station may perform a query operation on the first RET. Alternatively, the first permission information is that a permission of the first base station to perform an operation on the first RET is a control permission. That is, the first base station may perform a control operation on the first RET.

A second applicable scenario: the first permission configuration file includes information about a first permission of a first base station to perform an operation on a first RET, and further includes information about a second permission of a second base station to perform an operation on the first RET. The first permission includes at least a query permission or a control permission. In addition, a permission of the second base station to perform an operation on the first RET does not conflict with a permission of the first base station to perform an operation on the first RET. For example, the second permission is different from the first permission, or both the second permission and the first permission are query permissions.

A third applicable scenario: the first permission configuration file includes information about a first permission of a first base station to perform an operation on a first RET, and further includes information about a second permission of a second base station to perform an operation on the first RET, and information about a third permission of the second base station to perform an operation on a second RET. The first permission includes at least a query permission or a control permission. The third permission includes at least a query permission or a control permission. The second permission is different from the first permission, or both the second permission and the first permission are query permissions.

A fourth applicable scenario: the first permission configuration file includes the information about the first permission of the first base station to perform an operation on the first RET, and further includes information about a third permission of a second base station to perform an operation on a second RET. The first permission includes at least a query permission or a control permission, and the third permission includes at least a query permission or a control permission.

Specifically, that the remote control unit RCU obtains the first permission configuration file may include at least the following two implementation manners:

A first implementation manner: the RCU is connected to a personal computer PC, to implement configuration of the first permission configuration file in the RCU.

A second implementation manner: the RCU obtains a first permission configuration file that is sent by the first base station, where the first base station establishes a connection to the RCU by using a first AISG port.

Step 602: The RCU configures, according to the first permission configuration file, a first permission of a first base station to perform an operation on a first RET.

Specifically, for the foregoing implementation scenario, that the RCU configures, according to the first permission configuration file, the first permission of the first base station to perform an operation on the first RET includes at least the following four implementation manners:

A first implementation manner: for the foregoing first applicable scenario, the RCU may determine a third correspondence among the first base station, a first Antenna Interface Standards Group AISG port, and the first RET according to the first permission configuration file, where the first AISG port is a port connecting the RCU and the first base station. Then, the RCU configures, according to the third correspondence, the first permission of the first base station to perform an operation on the first RET.

A second implementation manner: for the foregoing second applicable scenario, the RCU may determine a third correspondence among the first base station, a first Antenna Interface Standards Group AISG port, and the first RET according to the first permission configuration file, where the first AISG port is a port connecting the RCU and the first base station. Then, the RCU configures, according to the third correspondence, the first permission of the first base station to perform an operation on the first RET. In addition, the RCU configures a first correspondence among the second base station, a second AISG port, and the first RET according to the first permission configuration file, where the second AISG port is a port connecting the RCU and the second base station. The RCU configures, according to the first correspondence, the second permission of the second base station to perform an operation on the first RET.

A third implementation manner: for the foregoing third applicable scenario, the RCU may determine a third correspondence among the first base station, a first Antenna Interface Standards Group AISG port, and the first RET according to the first permission configuration file, where the first AISG port is a port connecting the RCU and the first base station. Then, the RCU configures, according to the third correspondence, the first permission of the first base station to perform an operation on the first RET. In addition, the RCU determines a first correspondence among the second base station, a second AISG port, and the first RET according to the first permission configuration file, where the second AISG port is a port connecting the RCU and the second base station. The RCU configures, according to the first correspondence, the second permission of the second base station to perform an operation on the first RET. In addition, the RCU determines a second correspondence among the second base station, the second AISG port, and the second RET according to the first permission configuration file, where the second AISG port is the port connecting the RCU and the second base station. The RCU configures, according to the second correspondence, the third permission of the second base station to perform an operation on the second RET.

A fourth implementation manner: for the foregoing fourth applicable scenario, the RCU may determine a third correspondence among the first base station, a first Antenna Interface Standards Group AISG port, and the first RET according to the first permission configuration file, where the first AISG port is a port connecting the RCU and the first base station. Then, the RCU configures, according to the third correspondence, the first permission of the first base station to perform an operation on the first RET. In addition, the RCU determines a second correspondence among the second base station, a second AISG port, and the second RET according to the first permission configuration file, where the second AISG port is a port connecting the RCU and the second base station. The RCU configures, according to the second correspondence, the third permission of the second base station to perform an operation on the second RET.

In this embodiment, a remote control unit RCU obtains a first permission configuration file, where the first permission configuration file includes information about a first permission of a first base station to perform an operation on a first remote electrical tilt RET unit, and the first permission includes at least a query permission or a control permission; and the RCU configures, according to the first permission configuration file, the first permission of the first base station to perform an operation on the first RET. This enables the first base station to perform configuration of a management operation on the first RET, thereby implementing, by configuring different permission configuration files in the RCU, that a same base station manages different RETs, and further improving operability of managing a remote electrical tilt RET unit.

On the basis of the foregoing embodiment, after step 602, the method may further include:

obtaining, by the RCU, a second permission configuration file.

In this embodiment, the second permission configuration file includes information about a fourth permission of a third base station to perform an operation on the first RET, where the fourth permission includes at least a query permission or a control permission.

The obtaining, by the RCU, a second permission configuration file includes at least the following two implementation manners:

A first implementation manner: the RCU is connected to a personal computer PC, to implement configuration of the second permission configuration file in the RCU.

A second implementation manner: the RCU obtains a second permission configuration file that is sent by the second base station, where the second base station establishes a connection to the RCU by using the second AISG port.

The RCU configures, according to the second permission configuration file, the fourth permission of the third base station to perform an operation on the first RET.

Specifically, the RCU determines a fourth correspondence among the third base station, a third AISG port, and the first RET according to the second permission configuration file, where the third AISG port is a port connecting the RCU and the third base station. Then, the RCU configures, according to the fourth correspondence, the fourth permission of the third base station to perform an operation on the first RET.

Optionally, the second permission configuration file may further include information about the fourth permission of the first base station to perform an operation on the first RET or configuration of the fourth permission of the first base station for a third RET. The fourth permission includes at least a query permission or a control permission, where information included in the second permission configuration file is not limited herein.

In this embodiment, it is implemented that multiple base stations perform operation configuration on a same RET, thereby implementing different management requirements of the multiple base stations for the same RET and management requirements of the multiple base stations for different RETs, and further improving operability of a RET by a base station and operation flexibility.

It should be noted that, either of the second permission or the first permission is the same as the third permission. The third permission is a control permission, that is, the second base station controls the second RET. After the RCU configures, according to the second permission configuration file, the fourth permission of the third base station to perform an operation on the first RET, the method may further include:

deleting, by the RCU, the first permission of the first base station to perform an operation on the first RET, where first permission is a control permission; or deleting, by the RCU, the second permission of the second base station to perform an operation on the first RET, where the second permission is a control permission.

In this embodiment, when the second permission configuration file received by the RCU conflicts with the first permission configuration file received by the RCU, that is, when multiple base stations perform control permission configuration on a same RET, the RCU determines that a last received permission configuration file, that is, the second permission configuration file, has a highest priority, and then configures configuration indicated by the second permission configuration file, and deletes conflicting configuration information from the first permission configuration file. In addition, the RCU combines the second permission configuration file and the first permission configuration file, and updates conflicting permission configuration as a permission indicated by the second permission configuration file.

For example, if the second permission configuration file includes an exclusive permission of the second base station for the first RET, the RCU deletes the first permission of the first base station to perform an operation on the first RET. If the second permission configuration file includes a control permission of the second base station for the first RET, the RCU deletes the first permission of the first base station to perform an operation on the first RET, that is, the control permission. Further, the RCU may update a permission of the first base station to perform an operation on the first RET as a query permission.

It should be noted that, when multiple base stations perform operations on a same RET, in this embodiment, only one base station has a control permission for the RET, and the remaining base stations may perform a query operation or another non-control operation on the RET, preventing multiple base stations from controlling a same RET.

Figure 7:
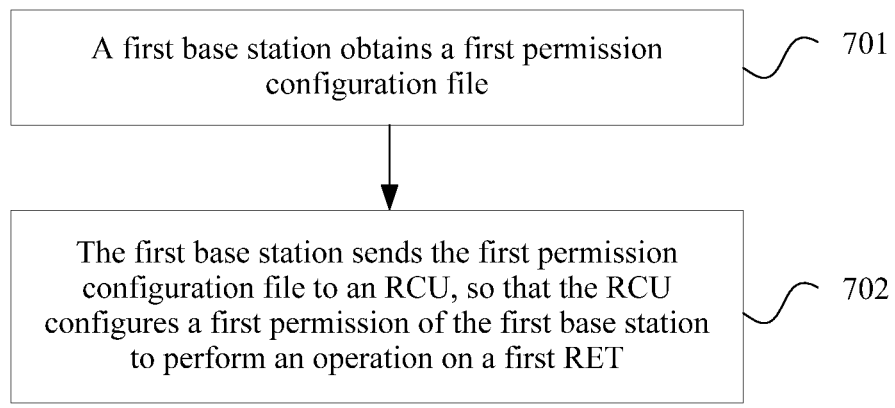
FIG. 7 is a flowchart of a remote electrical tilt antenna management method according to another embodiment of the present application.

FIG. 7 is a flowchart of a remote electrical tilt antenna management method according to another embodiment of the present application. As shown in FIG. 7, the method includes the following steps:

Step 701: A first base station obtains a first permission configuration file.

In this embodiment, the first permission configuration file may include information about a first permission of the first base station to perform an operation on a first remote electrical tilt RET unit, where the first permission includes at least a query permission or a control permission.

Further, the first permission configuration file may further include information about a second permission of a second base station to perform an operation on the first RET, where the second permission is different from the first permission, or both the second permission and the first permission are query permissions.

Optionally, the first permission configuration file includes the information about the first permission of the first base station to perform an operation on the first remote electrical tilt RET unit. In addition, the first permission configuration file may further include information about a third permission of the second base station to perform an operation on a second RET. The third permission includes at least a query permission or a control permission.

Optionally, the first permission configuration file includes the information about the first permission of the first base station to perform an operation on the first remote electrical tilt RET unit. The first permission configuration file may further include the information about the third permission of the second base station to perform an operation on the second RET, where the third permission includes at least a query permission or a control permission. In addition, the first permission configuration file may further include the information about the second permission of the second base station to perform an operation on the first RET. The second permission is different from the first permission, or both the second permission and the first permission are query permissions.

Step 702: The first base station sends the first permission configuration file to an RCU, so that the RCU configures a first permission of the first base station to perform an operation on a first RET.

Specifically, after the first base station sends the first permission configuration file to the RCU, the RCU may determine a first correspondence among the first base station, a first AISG port, and the first RET according to the first permission configuration file, where the first AISG port is a port connecting the RCU and the first base station. Then, the RCU configures, according to the first correspondence, the first permission of the first base station to perform an operation on the first RET.

In this embodiment, a first base station obtains a first permission configuration file, where the first permission configuration file includes information about a first permission of the first base station to perform an operation on a first RET, and the first permission includes at least a query permission or a control permission; and the first base station sends the first permission configuration file to a remote control unit RCU, so that the RCU configures the first permission of the first base station to perform an operation on the first RET. This enables the first base station to perform configuration of a management operation on the first RET, thereby implementing, by configuring different permission configuration files by a base station in the RCU, that a same base station manages different RETs, and further improving operability of managing a remote electrical tilt RET unit.

Further, on the basis of the foregoing embodiment, the method may further include:

obtaining, by the first base station, a second permission configuration file.

In this embodiment, the second permission configuration file includes information about a second permission of the first base station to perform an operation on the second RET, and the second permission includes at least a query permission or a control permission.

The first base station sends the second permission configuration file to the RCU, so that the RCU configures the second permission of the first base station to perform an operation on the second RET. The second permission configuration file includes information about a third permission of a third base station to perform an operation on the first RET, where the third permission information includes a control permission or a query permission.

Figure 8:
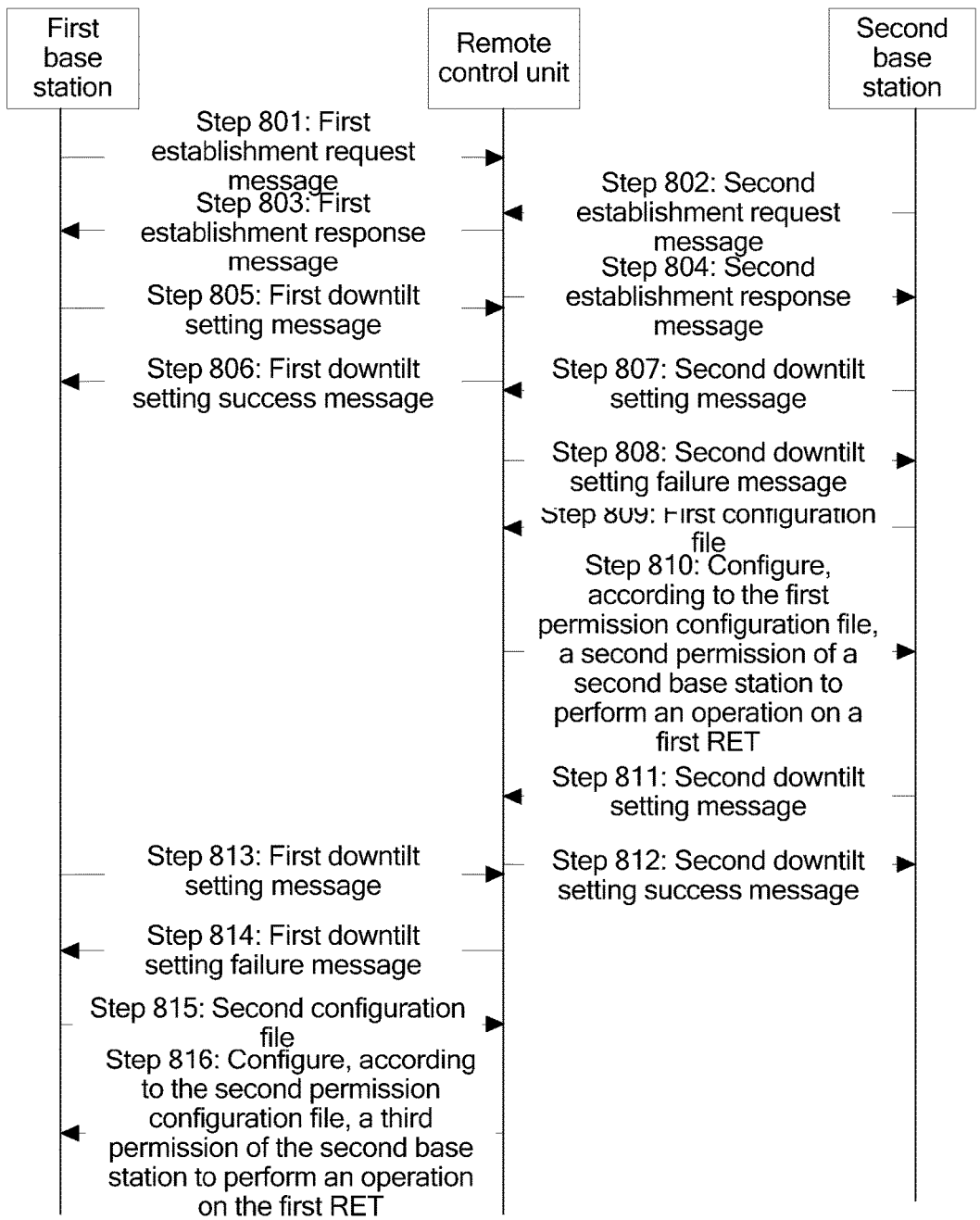
FIG. 8 is a flowchart of a remote electrical tilt antenna management method according to still another embodiment of the present application.

FIG. 8 is a flowchart of a remote electrical tilt antenna management method according to still another embodiment of the present application. As shown in FIG. 8, the method includes the following steps:

Step 801: A first base station sends a first establishment request message to an RCU.

In this embodiment, the first establishment request message is used to request the first base station to establish a connection to a first RET.

Step 802: A second base station sends a second establishment request message to the RCU.

In this embodiment, the second establishment request message is used to request the second base station to establish a connection to the first RET.

Step 803: The RCU sends a first establishment response message to the first base station.

In this embodiment, the first establishment response message carries information indicating completion of the connection established between the first base station and the first RET.

It should be noted that, after the first base station first establishes the connection to the first RET by using the RCU, the RCU configures, by default, that the first base station has a control permission for the first RET.

Step 804: The RCU sends a second establishment response message to the second base station.

In this embodiment, the second establishment response message carries information indicating completion of the connection established between the second base station and the first RET.

It should be noted that, the connection established between the second base station and the first RET is performed after the connection established between the first base station and the first RET, Therefore, the RCU configures, by default, that the second base station has a query permission for the first RET.

Step 805: The first base station sends a first downtilt setting message to the RCU.

In this embodiment, the first downtilt setting message carries information indicating that the first base station instructs the first RET to adjust a downtilt angle.

Step 806: The RCU sends a first downtilt setting success message to the first base station.

Step 807: The second base station sends a second downtilt setting message to the RCU.

In this embodiment, the second downtilt setting message carries information indicating that the second base station instructs the first RET to adjust a downtilt angle.

Step 808: The RCU sends a second downtilt setting failure message to the second base station.

Step 809: The second base station sends a first permission configuration file to the RCU.

In this embodiment, the first permission configuration file includes information about a second permission of the second base station to perform an operation on the first RET, where for example, the second permission is control; and includes information about a first permission of the first base station to perform an operation on the first RET. The first permission configuration file is listed in Table 1. A first base station corresponding to a base station number 1 is connected to a first RET with a sequence number SN1 by using a port 0, that is, a first AISG port, and a a permission type is a query permission. A second base station corresponding to a base station number 2 is connected to the first RET with the sequence number SN1 by using a port 1, that is, a second AISG port, and a permission type is a control permission.

TABLE 1

| Base station number | Port | RET sequence number | Permission type |
|---|---|---|---|
| 1 | 0 | SN1 | Query |
| 2 | 1 | SN1 | Control |

It should be noted that, an example in which the second base station sends the first configuration file to the RCU is used herein, which, however, is not limited in this embodiment. That is, any base station may send the first configuration file to the RCU.

Step 810: The RCU configures, according to the first permission configuration file, a second permission of the second base station to perform an operation on the first RET.

Specifically, the RCU determines a second correspondence among the second base station, the second AISG port, and the first RET according to the first permission configuration file, where the second AISG port is a port connecting the RCU and the second base station. Then, the RCU configures, according to the second correspondence, the second permission of the second base station to perform an operation on the first RET. In addition, the RCU determines a first correspondence among the first base station, the first AISG port, and the first RET according to the first permission configuration file, where the first AISG port is a port connecting the RCU and the first base station. Then, the RCU configures, according to the first correspondence, the first permission of the first base station to perform an operation on the first RET.

Step 811: The second base station sends a second downtilt setting message to the RCU.

In this embodiment, the second downtilt setting message carries information indicating that the second base station instructs the first RET to adjust a downtilt angle.

Step 812: The RCU sends a second downtilt setting success message to the second base station.

Step 813: The first base station sends a first downtilt setting message to the RCU.

In this embodiment, the first downtilt setting message carries information indicating that the first base station instructs the first RET to adjust a downtilt angle.

Step 814: The RCU sends a first downtilt setting failure message to the first base station.

Step 815: The first base station may send a second permission configuration file to the RCU.

In this embodiment, the second permission configuration file includes information about a third permission of the first base station to perform an operation on the first RET, where for example, the third permission is control. Further, the second permission configuration file may further include information about a fourth permission of the second base station to perform an operation on the first RET, where for example, the fourth permission is a query permission.

The second permission configuration file is listed in Table 2. A first base station corresponding to a base station number 1 is connected to a first RET with a sequence number SN1 by using a port 0, that is, a first AISG port, and a permission type is a control permission. A second base station corresponding to a base station number 2 is connected to the first RET with the sequence number SN1 by using a port 1, that is, a second AISG port, and a c permission type is a query permission.

TABLE 2

| Base station number | Port | RET sequence number | Permission type |
|---|---|---|---|
| 1 | 0 | SN1 | Control |
| 2 | 1 | SN1 | Query |

It should be noted that, an example in which the first base station sends the second configuration file to the RCU is used herein, which, however, is not limited in this embodiment. That is, any base station may send the second permission configuration file to the RCU.

Step 816: The RCU configures, according to the second permission configuration file, a fourth permission of the second base station to perform an operation on the first RET.

Specifically, the RCU determines a third correspondence among the first base station, the first AISG port, and the first RET according to the second permission configuration file, where the first AISG port is a port connecting the RCU and the first base station. Then, the RCU configures, according to the third correspondence, the third permission of the first base station to perform an operation on the first RET. The RCU determines a fourth correspondence among the second base station, the second AISG port, and the first RET according to the second permission configuration file, where the second AISG port is a port connecting the RCU and the second base station. Then, the RCU configures, according to the fourth correspondence, the fourth permission of the second base station to perform an operation on the first RET.

Further, the first base station sends a first downtilt setting message to the RCU, where the first downtilt setting message carries information indicating that the first base station instructs the first RET to adjust a downtilt angle. Then, the RCU sends a first downtilt setting success message to the first base station.

Optionally, the second base station sends a second downtilt setting message to the RCU, where the second downtilt setting message carries information indicating that the second base station instructs the first RET to adjust a downtilt angle. Then, the RCU sends a second downtilt setting failure message to the second base station.

In this embodiment, a second base station may deliver a configuration file to an RCU, thereby implementing operation configuration for a first RET, and further improving flexibility of performing an operation on the first RET.

It should be noted that, when the RCU receives configuration files for a same RET, a last received configuration file has a higher priority than any previously received configuration file. Then the RCU performs permission configuration between a base station and a RET according to the last received configuration file.

An embodiment provides a remote electrical tilt antenna management system, including: the remote electrical tilt antenna management apparatus shown in FIG. 2 and the remote electrical tilt antenna management apparatus shown in FIG. 3.

An embodiment provides a remote electrical tilt antenna management system, including: the remote controller shown in FIG. 4 and the base station shown in FIG. 5.

Persons of ordinary skill in the art may understand that all or a part of the steps of the method embodiments may be implemented by a program instructing relevant hardware. The program may be stored in a computer readable storage medium. When the program runs, the steps of the method embodiments are performed. The foregoing storage medium includes: any medium that can store program code, such as a ROM, a RAM, a magnetic disk, or an optical disc.

Finally, it should be noted that the foregoing embodiments are merely intended to describe the technical solutions of the present application but not to limit the present application. Although the present application is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of the present application.

What is claimed is:

1. A remote controller, comprising:
    an obtainer, configured to obtain a first permission configuration file, wherein the first permission configuration file comprises information about a first permission of a first base station to perform an operation on a first remote electrical tilt (RET) unit, and the first permission comprises at least a query permission or a control permission; and
    a processor, configured to configure, according to the first permission configuration file, the first permission of the first base station to perform an operation on the first RET, and to configure, according to the first permission configuration file, the second permission of the second base station to perform an operation on the first RET.

2. The remote controller according to claim 1, wherein the processor is further configured to configure, according to the first permission configuration file, a third permission of a second base station to perform an operation on a second RET.

3. The remote controller according to claim 2, wherein the processor is configured to determine a second correspondence among the second base station, the second AISG port, and the second RET according to the first permission configuration file, and the second AISG port is the port connecting the RCU and the second base station; and the RCU configures, according to the second correspondence, the third permission of the second base station to perform an operation on the second RET.

4. The remote controller according to claim 1, wherein the processor is configured to: determine a first correspondence among the second base station, a second Antenna Interface Standards Group (AISG) port, and the first RET according to the first permission configuration file, wherein the second AISG port is a port connecting an remote control unit, RCU, and the second base station; and configure, according to the first correspondence, the second permission of the second base station to perform an operation on the first RET.

5. The remote controller according to claim 1, wherein the processor is configured to determine a third correspondence among the first base station, a firstAISG port, and the first RET according to the first permission configuration file, and the firstAISG port is a port connecting the RCU and the first base station; and the RCU configures, according to the third correspondence, the first permission of the first base station to perform an operation on the first RET.

6. The remote controller according to claim 1, wherein the obtainer is further configured to obtain a second permission configuration file, wherein the second permission configuration file comprises information about a fourth permission of a third base station to perform an operation on the first RET, and the fourth permission comprises at least a query permission or a control permission; and
    the processor is further configured to configure, according to the second permission configuration file, the fourth permission of the third base station to perform an operation on the first RET.

7. The remote controller according to claim 6, wherein the processor is configured to configure, according to the second permission configuration file, a fifth permission of the third base station to perform an operation on the second RET.

8. The remote controller according to claim 6, wherein the processor is configured to determine a fourth correspondence among the third base station, a third AISG port, and the first RET according to the second permission configuration file, and the third AISG port is a port connecting the RCU and the third base station; and the RCU configures, according to the fourth correspondence, the fourth permission of the third base station to perform an operation on the first RET.

9. The remote controller according to claim 6, wherein the processor is further configured to: delete the first permission of the first base station to perform an operation on the first RET, wherein the first permission is a control permission; or delete the second permission of the second base station to perform an operation on the first RET, wherein the second permission is a control permission.

10. The remote controller according to claim 1, wherein the obtainer is configured to obtain a first permission configuration file that is sent by the first base station; or the obtainer is configured to obtain a second permission configuration file that is sent by the third base station.

11. A base station, comprising:

an obtainer, configured to obtain a first permission configuration file, wherein the first permission configuration file comprises information about a first permission of a first base station to perform an operation on a first remote electrical tilt (RET) unit, and the first permission comprises at least a query permission or a control permission; and a transmitter, configured to send the first permission configuration file to an remote control unit RCU, so that the RCU configures the first permission of the first base station to perform an operation on the first RET, wherein the first permission configuration file further comprises information about a second permission of a second base station to perform an operation on the first RET, and the second permission is different from the first permission, or both the second permission and the first permission are query permissions.

12. The base station according to claim 11, wherein the first permission configuration file further comprises information about a third permission of the second base station to perform an operation on a second RET, and the third permission comprises at least a query permission or a control permission.

13. The base station according to claim 11, wherein the transmitter is further configured to send a second permission configuration file to the RCU, so that the RCU configures a second permission of the first base station to perform an operation on the second RET, wherein the second permission configuration file comprises information about a third permission of the third base station to perform an operation on the first RET, and the third permission comprises a control permission or a query permission.

* * * * *